United States Patent [19]

Lamminen

[11] Patent Number: 5,245,725
[45] Date of Patent: Sep. 21, 1993

[54] VEHICLE WASHING APPARATUS UTILIZING BOTH BRUSHES AND NOZZLES FOR SELECTIVE CLEANING OF DIFFERENT PORTIONS OF A VEHICLE

[75] Inventor: Olli Lamminen, Ann Arbor, Mich.

[73] Assignee: InterClean Equipment, Inc., Ann Arbor, Mich.

[21] Appl. No.: 930,173

[22] Filed: Aug. 17, 1992

[51] Int. Cl.$^5$ ............................................. B60S 3/06
[52] U.S. Cl. ............................. 15/53.3; 15/DIG. 2; 134/123; 134/181
[58] Field of Search ................... 15/53.2, 53.3, 53.1, 15/97.3, DIG. 2; 134/123, 180, 181

[56] References Cited

U.S. PATENT DOCUMENTS

| | | | |
|---|---|---|---|
| 3,451,085 | 6/1969 | Hay | 15/53.3 |
| 4,562,848 | 1/1986 | Messing et al. | 15/53.3 |
| 4,920,997 | 5/1990 | Vetter et al. | 134/123 |
| 5,020,556 | 6/1991 | Lamminen | 134/123 |

FOREIGN PATENT DOCUMENTS 434039 11/1974 U.S.S.R. .................... 15/DIG. 2

Primary Examiner—Edward L. Roberts
Attorney, Agent, or Firm—Harness, Dickey & Pierce

[57] ABSTRACT

A vehicle washing apparatus in which both brushes and high pressure spray nozzles are used for selectively cleaning different portions of a vehicle. The high pressure nozzles and the brushes are both mounted to the same mounting structure for movement together, relative to the vehicle, such that the nozzles are maintained at the optimum distance from the vehicle surface for maximum cleaning effectiveness. The high pressure spray nozzles are used to clean selected portions of a vehicle that are susceptible to damage by the brushes used to clean other portions of the vehicle.

6 Claims, 2 Drawing Sheets

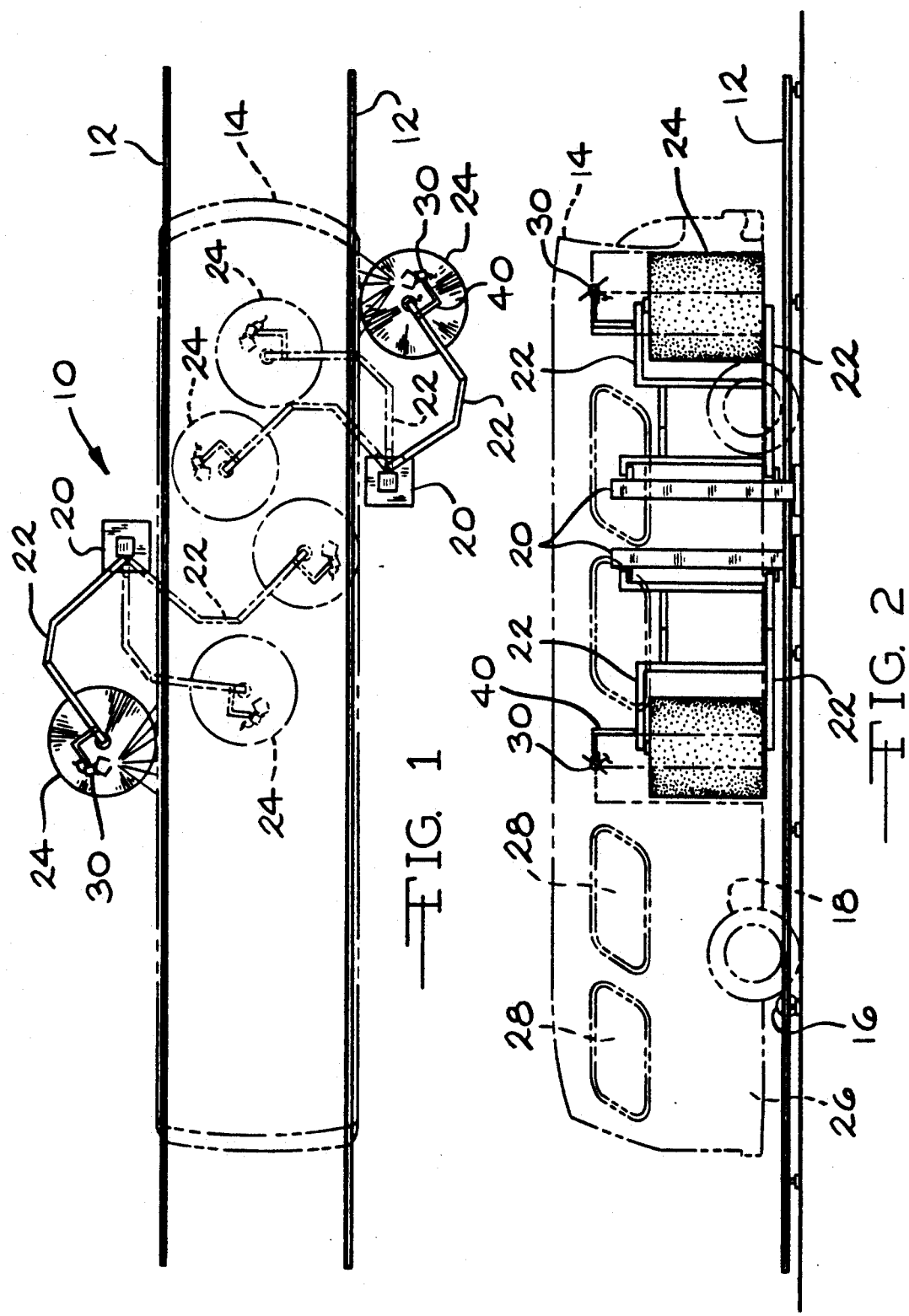

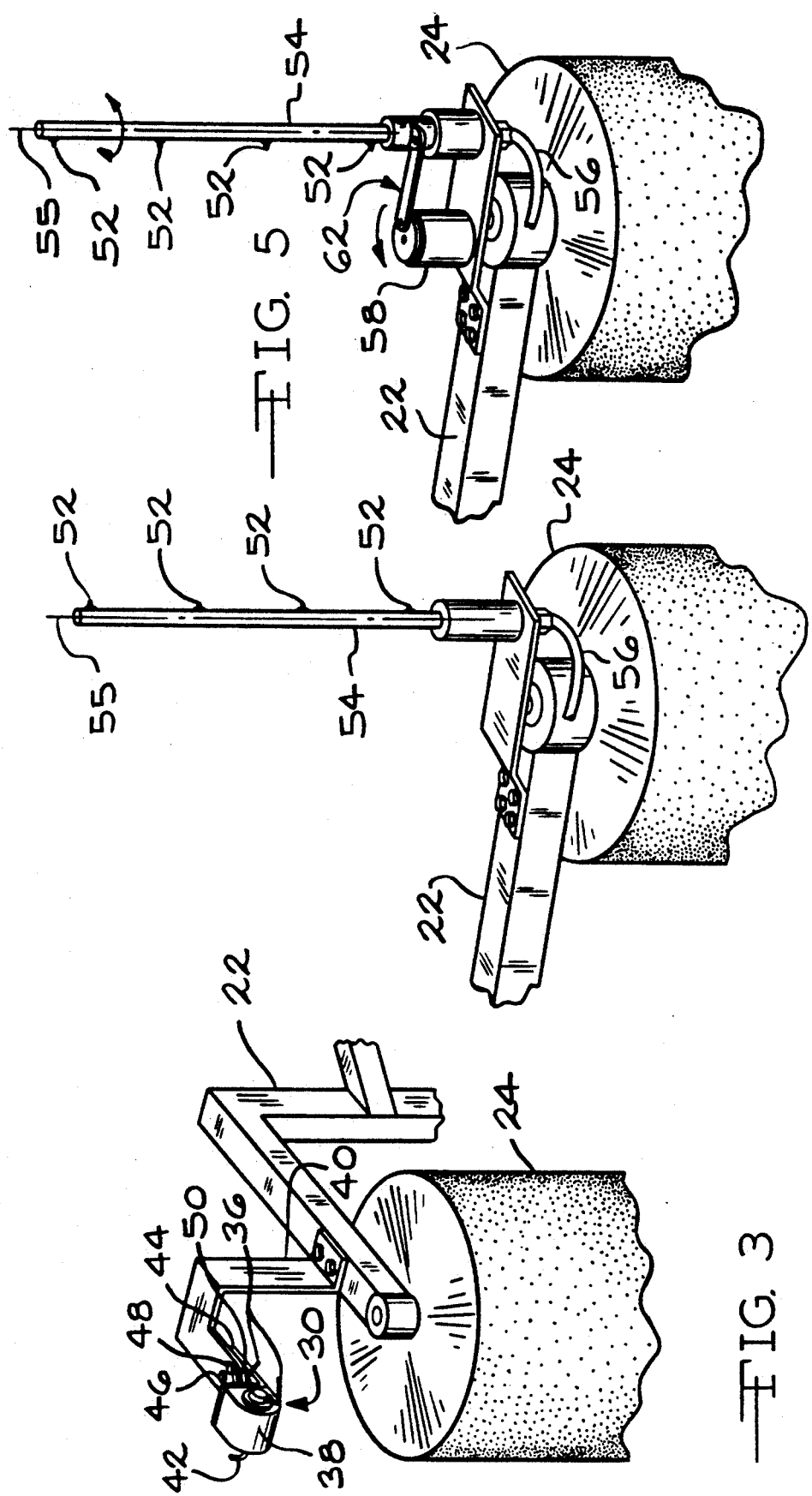

VEHICLE WASHING APPARATUS UTILIZING BOTH BRUSHES AND NOZZLES FOR SELECTIVE CLEANING OF DIFFERENT PORTIONS OF A VEHICLE

BACKGROUND AND SUMMARY OF THE INVENTION

The present invention relates to a vehicle washing apparatus and in particular to a vehicle washing apparatus employing both brushes and spray nozzles for selective cleaning of different portions of the vehicle.

It is common for a vehicle wash apparatus to include moving or rotating brushes which physically contact the surface of a vehicle being washed to remove dirt and debris therefrom. However, certain materials used in vehicles are susceptible to damage from the brush bristles or from the action of the brush bristles carrying dirt and other debris across the vehicle surface. One application where the brushes cause damage is with vehicle windows made of plastic such as DuPont Lucite or General Electric Lexan. These materials are commonly used as windows for buses.

One solution to the problem of brush induced damage is to use high pressure water spray nozzles to remove dirt as opposed to using the brushes. However, water spray nozzles mounted in a fixed position in a wash apparatus are not as effective in cleaning a vehicle as are brushes. This is due to the fact that the distance between a fixed water nozzle and a vehicle surface varies with the vehicle size and shape.

It is an object of the present invention to provide a vehicle wash apparatus which effectively cleans the vehicle in a manner which does not damage delicate materials.

It is a feature of the present invention that high pressure water nozzles are used to spray the delicate surface materials while brushes are used to clean other surfaces not susceptible to damage. In order to maintain the spray nozzles in the optimum position relative to the vehicle surface, the spray nozzles are mounted to the booms carrying the brushes which are moved into contact with the vehicle and then follow the contours of the vehicle. In a preferred embodiment for cleaning buses, which typically have a number of windows along the top half of the side wall, the wash apparatus is equipped with brushes to clean the lower half of the bus side wall and with spray nozzles mounted to the brush booms above the brushes for cleaning the windows along the upper half of the bus side wall.

Further objects, features and advantages of the invention will become apparent from a consideration of the following description and the appended claims when taken in connection with the accompanying drawings.

BRIEF DESCRIPTION OF THE DRAWINGS

FIG. 1 is a schematic plan view of the vehicle washing apparatus of the present invention;

FIG. 2 is a side elevational view of the wash apparatus shown in FIG. 1;

FIG. 3 is a view illustrating the attachment of the rotating spray nozzles to the brush boom;

FIG. 4 is an enlarged fragmentary view of an alternative embodiment utilizing fixed nozzles mounted to the brush boom; and FIG. 5 is an enlarged fragmentary view of yet another embodiment utilizing oscillating nozzles mounted to the brush boom.

DETAILED DESCRIPTION OF THE INVENTION

The vehicle wash apparatus of the present invention is shown in FIG. 1 and designated generally at 10. Wash apparatus lo is shown in connection with the washing of a bus but it is to be understood that the invention is not limited to an apparatus for washing buses but can be configured to clean other vehicles as well. The present invention is shown and described in a "drive through" wash apparatus where the bus is driven through the wash apparatus. The invention can also be incorporated into a gantry type wash apparatus as well, where the bus is stationary and the wash apparatus moves over the bus.

The wash apparatus 10 includes a pair of raised curbs 12 for guiding a bus 14 through the wash apparatus. The bus is moved forward through the apparatus by operation of a drive mechanism in the floor below the bus which includes a raised drive wheel 16 for engagement with the rear wheel 18 of the bus to push the bus through the washing apparatus. Such a drive mechanism is well known within the field of vehicle washing systems. Other components of the washing apparatus not pertinent to the present invention have not been disclosed such as the sensors for detecting the presence of a vehicle, structures supporting nozzles for spraying detergent and rinse water, etc.

Along each curb 12, a vertical standard 20 supports a boom 22. The booms 22 each carry a rotating brush 24 for engagement with the surface of the bus 14 to remove dirt from the bus. As shown in the Figures, the booms 22 are rotatable about a vertical axes of the standards to move the brushes 24 along the contour of the bus surface. In the apparatus illustrated in FIG. 1, the brush on the right of the bus cleans the front and right side wall while the brush on the left of the bus cleans the left side wall and rear of the bus.

As shown in FIG. 2, the brushes 24 are of a height to clean a lower portion of the bus side wall 26 below the windows 28. The windows 28 in many buses are made of a plastic resin and are susceptible to scratching by the brushes 24 or from dirt and debris carried by the brushes.

In order to clean the upper portion of the side wall 26 and the windows 28, the booms 22 carry a water spray nozzle 30 above the brushes 24 for directing a high pressure stream of water or other liquid against the windows and the upper portion of the side wall to remove dirt and debris therefrom. The spray nozzles 30, as shown in FIG. 3, are spinning nozzles having a plurality of nozzle outlets 36 and a housing 38 mounted to the booms 22 by brackets 40. Water or other liquid is supplied to the nozzles 30 by hoses 42 in a well known manner. The orientation of each nozzle 30 is adjusted by rotation of the mounting block 44 about bolt 46. The bolt 48 in slot 50 holds the nozzle firmly in position. Additional details of the rotating nozzles 30 are shown in U.S. Pat. No. 5,020,556, issued Jun. 4, 1991 and commonly assigned, which patent is hereby incorporated by references.

The rotating spray nozzles 30 are advantageous in cleaning around the windows because the varying direction of the liquid spray enables the spray stream to reach into crevices and recesses associated with the windows that can not be thoroughly cleaned with a rotating brush. By mounting the spray nozzles to the brush booms 22, the nozzles will move with the brushes to follow the contour of the vehicle. As a result, the spray nozzles 30 are maintained at an optimum distance from the vehicle surface for maximum cleaning effectiveness. This enables delicate vehicle surfaces, windows in this example, to be properly cleaned without physical contact by a brush. The remaining vehicle surfaces are cleaned by the brushes.

An alternative embodiment is shown in FIG. 4 where the spinning spray nozzles 30 have been replaced with fixed spray nozzles 52. The spray nozzles 52 are attached to a tube 54 extending generally upwardly from the boom 22 and having a longitudinal axis 55. Liquid is supplied to the tube through hose 56 in a conventional manner. While four nozzles 52 are shown, any number can be used depending on the size of the surface to be cleaned.

FIG. 5 shows another embodiment, similar to that shown in FIG. 4. In this embodiment, the tube 54 is not rigidly fixed to the boom but is mounted for rotation generally about its longitudinal axis. A drive motor 58, on boom 22, is connected to the tube 54 by a crank 60 to produce oscillating motion of the tube 54 and nozzles 52. The oscillating motion enables the liquid spray to reach crevices and recesses not easily reached by the fixed nozzles in FIG. 4.

By equipping the wash apparatus with both brushes and spray nozzles for cleaning separate sections of the vehicle surface, the wash apparatus can be tailored to the specific materials of the vehicle surface. Surfaces that are more sensitive to damage during cleaning can be cleaned in a manner which does not produce damage. By mounting the spray nozzles on the same movable beam which carries the brushes, the spray nozzles will follow the contour of the vehicle and be maintained at a proper distance from the vehicle surface for optimum cleaning performance. This can not be accomplished by mounting the spray nozzles to a fixed boom or archway through which the vehicle passes. As a result, the wash apparatus of the present invention provides for superior cleaning of vehicles.

It is to be understood that the invention is not limited to the exact construction illustrated and described above, but that various changes and modifications may be made without departing from the spirit and scope of the invention as defined in the following claims.

I claim:

1. An apparatus for washing a vehicle comprising:
   brush means;
   brush mounting means for mounting said brush means for contact with a first surface of a vehicle for cleaning said first surface;
   means for moving said vehicle relative to said brush means whereby said brush means moves across said first surface; and
   nozzle means for spraying a stream of liquid against a second surface of said vehicle distinct from said first surface for cleaning said second surface by mechanical action of said sprayed stream contacting said second surface, said nozzle means being attached to said brush mounting means for movement relative to said vehicle along with said brush means, said nozzle means including at least one spray nozzle attached to said brush mounting means for oscillating movement relative to said brush mounting means and drive means for oscillating said at least one nozzle.

2. The apparatus for washing a vehicle of claim 1 wherein said nozzle means includes a spinning spray nozzle having a housing and at least one spray outlet rotatable relative to said housing.

3. The apparatus for washing a vehicle of claim 1 wherein said nozzle means includes a tube extending from said brush mounting means with said at least one spray nozzle being mounted to said tube in fluid communication with the interior of said tube and means for supplying a liquid to said tube for spray discharge from said at least one spray nozzle.

4. The apparatus for washing a vehicle of claim 3 wherein said nozzle means includes an elongated tube having an longitudinal axis extending from said brush mounting means; and
   said oscillating means including means for attaching said tube to said brush mounting means for rotary movement of said tube about the longitudinal axis of said tube and a drive motor carried by said brush mounting means and coupled to said tube by a crank to rotate said tube back and forth about said tube axis to oscillate said tube.

5. The apparatus for washing a vehicle of claim 1 wherein said second vehicle surface is vertically above said first vehicle surface and said nozzle means is vertically above said brush means.

6. An apparatus for washing a bus having a side wall with an upper portion of said side wall containing a plurality of windows and a lower portion of said side wall being without windows, said apparatus comprising:
   brush means;
   brush mounting means for mounting said brush means for contact with said lower portion of said side wall for cleaning said lower portion of said side wall;
   means for moving said bus relative to said brush means whereby said brush means moves across said lower portion of said side wall;
   at least one spray nozzle for spraying a stream of liquid against said upper portion of said side wall for cleaning said upper portion of said side wall by mechanical action of said spray stream contacting said second surface; and
   means for attaching said at least one spray nozzle to said brush mounting means for movement of said at least one spray nozzle relative to said bus along with said brush means, said means for attaching said at least one spray nozzle providing for oscillating movement said at least one spray nozzle relative to said brush mounting means and drive means for oscillating said at least one spray nozzle.

* * * * *